(12) United States Patent
Schibsbye

(10) Patent No.: US 9,005,381 B2
(45) Date of Patent: Apr. 14, 2015

(54) METHOD OF MOULDING A WIND TURBINE BLADE

(75) Inventor: Karsten Schibsbye, Fredericia (DK)

(73) Assignee: Siemens Aktiengesellschaft, Munich (DE)

( * ) Notice: Subject to any disclaimer, the term of this patent is extended or adjusted under 35 U.S.C. 154(b) by 536 days.

(21) Appl. No.: 13/092,193

(22) Filed: Apr. 22, 2011

(65) Prior Publication Data

US 2011/0284150 A1 Nov. 24, 2011

(30) Foreign Application Priority Data

May 20, 2010 (EP) .................................... 10163393

(51) Int. Cl.
| | | |
|---|---|---|
| *B32B 37/10* | (2006.01) | |
| *B29C 70/34* | (2006.01) | |
| *B29C 33/68* | (2006.01) | |
| B29C 33/10 | (2006.01) | |
| B29K 23/00 | (2006.01) | |
| B29L 31/08 | (2006.01) | |

(52) U.S. Cl.
CPC ............... B29C 70/342 (2013.01); *B29C 33/10* (2013.01); B29C 33/68 (2013.01); *B29K 2023/06* (2013.01); *B29K 2023/12* (2013.01); *B29L 2031/082* (2013.01); *B29L 2031/085* (2013.01); *Y02E 10/721* (2013.01)

(58) Field of Classification Search
CPC ...... B29C 43/12; B29C 70/44; B29C 70/443; B32B 37/10; B32B 32/1018; B32B 37/003; B32B 27/00

USPC ............ 156/245, 285, 87, 381, 382; 264/511, 264/512, 571

See application file for complete search history.

(56) References Cited

U.S. PATENT DOCUMENTS

| | | | | |
|---|---|---|---|---|
| 5,052,906 | A | * 10/1991 | Seemann | ...................... 425/112 |
| 5,464,337 | A | * 11/1995 | Bernardon et al. | ............ 425/112 |
| 6,156,403 | A | 12/2000 | Cochran | |
| 2003/0116262 | A1* | 6/2003 | Stiesdal et al. | ................. 156/245 |
| 2004/0207121 | A1* | 10/2004 | Schiller | .......................... 264/338 |
| 2005/0194716 | A1 | 9/2005 | Mataya | |
| 2008/0219851 | A1* | 9/2008 | Althoff et al. | .................. 416/226 |

FOREIGN PATENT DOCUMENTS

| | | |
|---|---|---|
| CN | 101462360 A | 6/2009 |
| CN | 101590698 A | 12/2009 |
| CN | 101618606 A | 1/2010 |
| DE | 19926896 A1 | 12/2000 |
| EP | 1310351 A1 | 5/2003 |
| GB | 2087784 A | 6/1982 |

(Continued)

OTHER PUBLICATIONS

Campbell, "Manufacturing processes for advanced composites, Ply Collation: A Major Cost Driver", Elsevier Advanced Technology, Oxford, GB, Jan. 1, 2004, pp. 131-173, XP002535222.

*Primary Examiner* — Christopher Schatz

(57) ABSTRACT

A method of molding a wind turbine blade in a mold is provided. The method includes applying a film to an inside surface of a mold, assembling component layers for the wind turbine blade on the film, performing curing to harden the component layers, and subsequently removing the cured wind turbine blade from the mold. Also provided is a film suitable for use in a wind turbine blade molding process and a mold suitable for molding a wind turbine blade.

10 Claims, 3 Drawing Sheets

(56) References Cited

FOREIGN PATENT DOCUMENTS

| | | | |
|---|---|---|---|
| GB | 2259883 A | 3/1993 | |
| JP | 56058844 A | 5/1981 | |
| JP | 01087325 A | 3/1989 | |
| WO | WO 0018555 A1 | 4/2000 | |
| WO | WO 2004/069526 A1 | 8/2004 | |
| WO | 2009118695 A1 | 10/2009 | |

* cited by examiner

A)

B)

C)

D) X - X'

METHOD OF MOULDING A WIND TURBINE BLADE

CROSS REFERENCE TO RELATED APPLICATIONS

This application claims priority of European Patent Office application No. 10163393.1 EP filed May 20, 2010, which is incorporated by reference herein in its entirety.

FIELD OF INVENTION

The invention describes a method of moulding a wind turbine blade, a film for use in a wind turbine blade moulding process, and the use of such a film in the moulding of a wind turbine blade.

BACKGROUND OF INVENTION

Wind turbine rotor blades may be manufactured using a technique such as the closed-mould casting technique in which the entire blade can be moulded. Glass fibre matting can be used to build up component layers in a suitably shaped mould, and the layers of matting are bonded with a resin and cured in the mould to give a fibre-reinforced polymer or glass-reinforced plastic, generally referred to simply as 'fibreglass'. Such a method is described in EP 1 310 351 A1.

To facilitate releasing the finished fibreglass component after curing, the mould is usually coated with a release agent such as a suitable wax so that the resin does not bond with the mould. The release agent is applied to the mould before building up the fibreglass layers. Known release agents are polyvinyl alcohol, silicone wax, slip wax, etc. The release agent must be applied in a uniform layer, and this layer must be absolutely smooth if the outer surface of the cured blade is also to be smooth. However, it is not easy to apply the release agent so that these requirements are met, and the result can be an uneven or dimpled component surface. Furthermore, the types of release agent generally used contain volatile solvents, which pose a health risk to anyone exposed to them. However, the main disadvantage of having to use such a release agent is that, after curing, remnants of the release agent can adhere to the blade in places. These remnants of release agent must be removed in a time-intensive procedure such as scrubbing or sandblasting, adding to the overall cost of manufacture.

SUMMARY OF INVENTION

It is therefore an object of the invention to provide an improved way of manufacturing a wind turbine blade by moulding, overcoming the problems mentioned above.

The object of the invention is achieved by the features of the independent claims.

The method according to the invention of moulding a wind turbine blade in a mould comprises the steps of applying a film to an inside surface of the mould, assembling component layers for the wind turbine blade on the film, performing curing steps to harden the component layers, and subsequently detaching the cured wind turbine blade from the mould.

An obvious advantage of the method is that the film obviates the need for a release agent, so that it is no longer necessary to coat the inside surface (or 'interior surface') of the mould with a release agent, and it is no longer necessary to remove remnants of a release agent from the cured wind turbine blade. In this way, considerable savings can be made in the manufacturing process, without having to use an expensively prepared mould. Instead, a single sheet of film can simply be laid out to line the mould. After curing, the film can easily be detached from the wind turbine blade, as will be explained below.

According to the invention, a film suitable for use in a wind turbine blade moulding process comprises an outside surface for lining the interior surface of a mould, and an inside surface for receiving a component layers of the wind turbine blade prior to curing, and wherein the inside and outside surfaces of the film are realised to allow a complete detachment of the cured wind turbine blade from the mould after curing.

According to one aspect of the invention, the mould for moulding a wind turbine blade comprises an inside or interior surface suitable for receiving such a film, and a vacuum extraction outlet for applying a vacuum to extract air from between the film and the inside surface of the mould.

According to the invention, such a film may be used in the moulding of a wind turbine blade using the inventive moulding method.

Particularly advantageous embodiments and features of the invention are given by the dependent claims, as revealed in the following description. Features of the embodiments may be combined as desired to arrive at further embodiments.

The method according to the invention is particularly suited to moulding of large wind turbine blades that must be light and require a smooth outer surface suitable for the application of paint. Therefore, in a preferred embodiment of the invention, the component to be moulded comprises layers of a suitable material such as glass fibre or carbon fibre, which layers are bonded with a fibre reinforcement such as resin, glue, thermosetting plastic, etc. Bonding can be carried out in a number of ways. For example, dry fibreglass matting can be coated in resin during a manual laying step. Alternatively, previously impregnated fibre materials (known as 'prepreg') can be used, which are cured by heating, applying UV-irradiation, etc.

The method according to the invention can be used for any moulding technique in which layers are laid up on a mould prior to curing, and subsequently removed from the mould. For example, an essentially hollow wind turbine blade can be made by moulding two half-shells which are then joined at leading and trailing edges by gluing these together. The structure can be given additional support by one or more beams bonded to the inside faces of the half-shells. However, it can be difficult to ensure a satisfactory quality of the glue joints, due to the different material proerties—such as elastic modulus—of the half-shells and the glue used to bond them along their entire lengths. In the case of a wind turbine blade, these glue joints present a potential weakness and may eventually crack or open as a result of the extreme forces that can act on the blade. Therefore, in a particularly preferred embodiment of the invention, the mould comprises a closed mould for manufacturing a wind turbine blade in one piece. In the closed-mould approach, the fibreglass matting can be arranged around a core and this structure can then be enclosed in the mould. A fibre reinforcement such as resin or glue can be previously applied or introduced into the mould after it has been closed. After curing, the mould is opened and the wind turbine blade can be removed. Using this approach, it is possible to manufacture a large, hollow component such as a wind turbine blade in one piece and without any potentially critical glue joints.

The film used to line the mould can comprise any suitable material that does not adhere to the cured component layers, whether these comprise resin-filled fibre layers, thermosetting plastic layers, prepreg layers, etc. In a particularly preferred embodiment of the invention, therefore, the film comprises polyethylene, polypropylene, or any other suitable plastic, such as the type of film used to manufacture 'cling-film' or 'cling-wrap'. One or both surfaces of the film can have non-stick properties so that the film can easily be removed from the cured wind turbine blade and/or the mould. The term 'non-stick' in the context of a film surface is to be understood that the surface has properties that prevent other materials from sticking to it. For example, the film can comprise a polyvinyl chloride component to reduce the ability of other materials to stick to it. The film used to line the mould can be manufactured easily in the required width, and can be supplied on a roll for convenient dispensing.

The thickness of the film may determine the smoothness of the film layer laid out on the mould. Evidently, the film should be flexible enough so that it can line the mould without any wrinkles or folds forming. On the other hand, the film should be strong enough to allow it to be pulled off the cured component. Therefore, in a preferred embodiment of the invention, the thickness of the film is at least 20 μm and at most 200 μm, more preferably at most 100 μm.

As mentioned above, it is desirable for the film to have as smooth a surface as possible, without wrinkles or folds, so that the surface of the moulded component will be correspondingly smooth also. Therefore, in a further preferred embodiment of the invention, the method comprises the step of applying a vacuum between the film and the interior surface of the mould. The vacuum can be applied by drawing air out through a nozzle positioned between the film and the inside surface of the mould. Extraction of air from between the film and the mould can ensure that the film lines the mould smoothly. The vacuum need only be applied until the film is sufficiently 'pressed' into the mould. Thereafter, the vacuum extraction can be stopped and the component layers can be built up in the mould. Of course, if required, the vacuum can be applied also during laying up the layers, for example to prevent slippage of the film.

The material and structure of the film used to line the mould can be chosen according to process requirements. For example, as mentioned above, it is desirable to obtain as flat a surface as possible when extracting air by vacuum from between the film and the mould. However, during vacuum extraction, it may be that the film is sucked onto the inside surface of the mould such that small air pockets are trapped. Therefore, in a particularly preferred embodiment of the invention, the film comprises a relief structure on a surface of the film applied to the inside surface of the mould. This relief structure can comprise depressions such as dimples, or raised areas, and can serve to improve the adherence of the film to the inside surface the mould during the step of laying up the component layers prior to curing. A film that lies in close contact with the inside surface of the mould is preferable in order to avoid any slippage when the component layers are laid up in the mould. Alternatively, the relief structure can comprise a plurality of channels or grooves in the film, so that a vacuum, applied between the film and the inside surface of the mould, can optimally draw out any air without allowing any significant air pockets to remain. Such channels or grooves can easily be formed during manufacture of the film, for example in an extrusion process, and are preferably arranged such that they lie in essentially the same direction as the direction taken by the extracted air, i.e. in the direction of a vacuum nozzle. In a particularly simple realisation, the film comprises parallel grooves or channels along its length, and the film is laid lengthwise into the mould, so that vacuum nozzles positioned at each end of the mould can optimally extract any air from between the film and the mould.

Alternatively or in addition to the relief structure on the outside surface of the film, the mould itself can be realised to assist the vacuum extraction step. Therefore, in a preferred embodiment of the invention, the inside surface of the mould comprises at least one channel to facilitate the removal of air by vacuum extraction from between the film and the inside surface of the mould. Such a channel can be arranged to run the length of the mould, across the width of the mould, or in any appropriate way that would facilitate the extraction of air. Preferably, the mould comprise a plurality of channels, and these can be arranged to originate or terminate in the vicinity of a vacuum nozzle through which the air is drawn out from between the film and the inside surface of the mould.

After curing and removal of the component from the mould, the film may attach to the component. Depending on the properties of the film, this could simply be left on the component to act as an outer layer. However, for some finishing steps such as painting or varnishing, it may be preferably to carry these out on the actual component surface. Therefore, in a further embodiment of the invention, the method comprises the step of detaching the film from the component after the component has been removed from the mould so that the film may be peeled off the component. The film may simply be peeled off and discarded, but a robust film may lend itself to re-use in the moulding of a further wind turbine blade.

Regardless of whether a vacuum extraction step is used in lining the mould with the film, the film may remain in the mould when the cured component is removed. Then, the film can simply be peeled from the mould. However, it may be preferred to have the film detach entirely from the mould when the blade is removed after curing. Therefore, in a further preferred embodiment of the invention, the inside surface of the mould comprises a non-stick surface or lining. For example, the inside surface of the mould can be coated with a material such as Teflon®, which has favourable non-stick properties.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention.

DETAILED DESCRIPTION OF INVENTION

Figure 1:
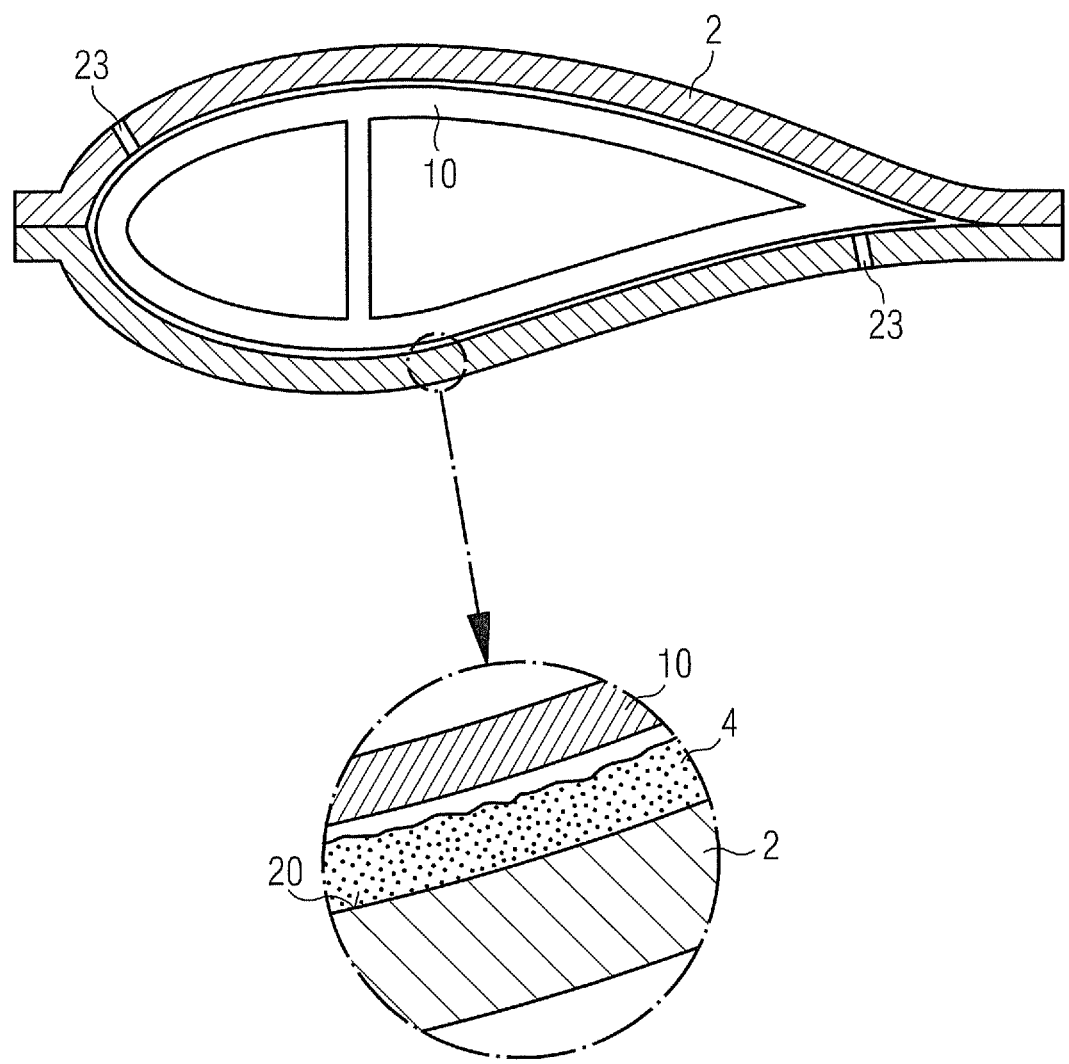
FIG. 1 shows a cross-section through a mould with laid-up component layers in a prior art component moulding process.

In the drawings, like reference numbers refer to like objects throughout. Objects in the diagrams are not necessarily drawn to scale.

FIG. 1 shows a cross-section through a mould 2 with laid-up component layers 10 in a prior art component moulding process such as that described in EP 1 310 351 A1, in which a wind turbine blade is formed of fibre layers 10 and cured in a closed mould 2 into which resin is injected under pressure. Here, the mould 2 comprises nozzles 23 through which air can be extracted during a vacuum extraction step, thus causing the component layers 10 to expand, and by means of which glue or resin is drawn into the component layers 10. To allow the cured wind turbine blade to be removed from the mould 2 without damage to its surface, a layer of release agent 4 such as silicone wax is applied to the inside surfaces 20 of the mould 2, as shown in the enlarged part of the diagram. When removing the cured blade from the mould 2, remnants of the wax 4 can remain stuck to the outer surface of the blade 1, and must be removed in an additional step such as scrubbing or sandblasting. Also, before the mould 2 can be used again, the release agent layer 4 must either be removed by scraping it off the inside surface 20 of the mould, or it must be smoothed again to give the required level of uniformity.

Figure 2:
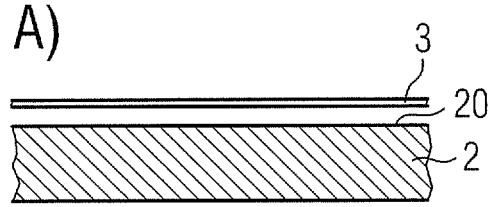
FIG. 2 shows a cross-section through a mould with laid-up component layers in a component moulding process according to the invention.
Figure 2:
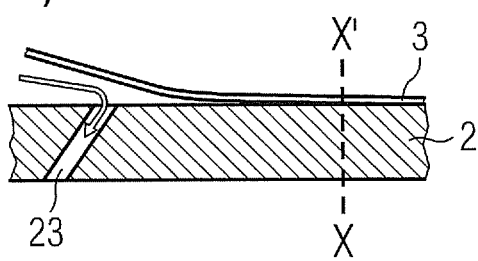
Figure 2:
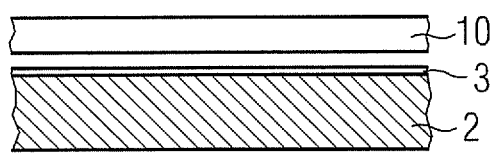
Figure 2:
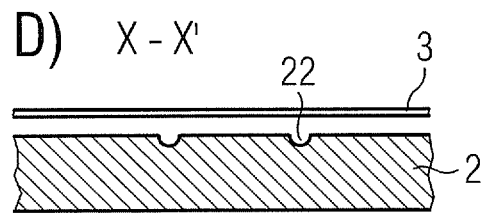

FIG. 2 shows a cross-section through a part of a mould 2 with laid-up component layers 10 in a component moulding process according to the invention. Essentially, the mould of FIG. 1 can be used. However, in contrast to the set-up shown in FIG. 1, instead of treating the inside surface 20 of the mould 2 with a release agent, a film 3 is used to line the mould 2, as shown in part A of the diagram. For the sake of clarity, because of the relative thicknesses of the film 3 and the mould 2, only a small region of the entire set-up is shown. The film 3 can be optimally drawn onto the inside surface 20 of the mould 2 by extracting air from between the film 3 and the mould 2. To this end, as shown in part B of the diagram, a vacuum is applied between the film 3 and the mould 2, and air is extracted through a vacuum nozzle 23. Then, once the mould 2 is satisfactorily lined with the film 3, layers 10 of fibre material (e.g. carbon-fibre, glass fibre, prepreg, etc.) can be laid up as desired, as shown in part C of the diagram. The remainder of the moulding process can be carried out in the usual manner, with a vacuum extraction step for drawing out air through a vacuum nozzle as shown in FIG. 1 to allow the component layers to expand, and a curing process to harden the layers. Evidently, a single vacuum nozzle could be used for both air extraction steps, and the vacuum nozzle could be realized to intrude between the film 3 and the mould 2 for the first extraction step, and to intrude between the film 3 and the component layers 10 for the second extraction step. Part D of the diagram shows the section X-X' taken through the mould 2 and film 3 shown in Part B. Here, additional channels 22 in the inside surface 20 of the mould allow a more optimal extraction of air from the space between the film 3 and the mould 2. Here, the channels 22 are arranged in the direction of the vacuum extraction nozzle 23.

Figure 3:
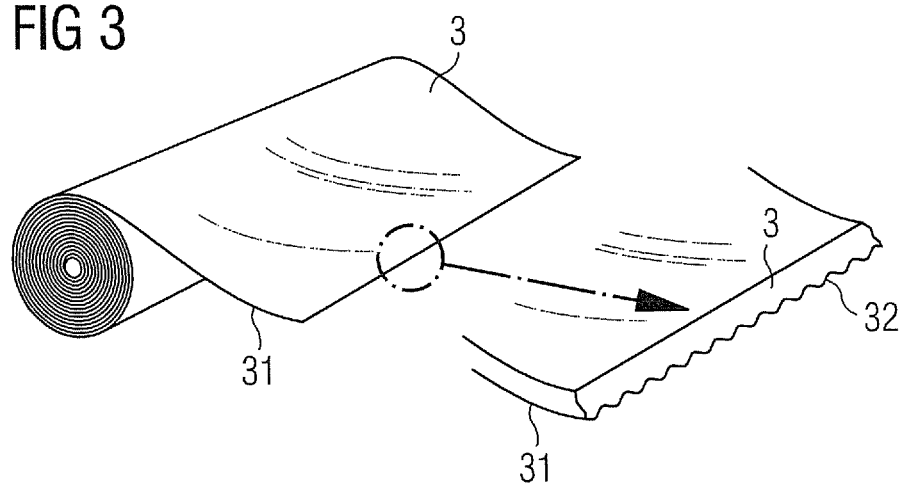
FIG. 3 shows a film according to an embodiment of the invention.

FIG. 3 shows a cross-section through a film 3 according to an embodiment of the invention. Here, the film 3 is a thin film 3 of propylene or polyethylene, with a thickness in the range 20 μm to 100 μm. The 'inside surface' 31 of the film 3, which will be in contact with the component layers, is preferably flat and smooth. Along its length on the 'outside surface' 32 (i.e. the surface which will be in contact with the interior surface of the mould), the film 3 exhibits channels 32 or grooves 32. The film 3 is preferably laid into the mould so that these grooves 32 lie in the direction of a vacuum extraction nozzle. In this way, air can be optimally drawn out from the space between the film 3 and the inside surface of the mould during the vacuum extraction step. However, a vacuum extraction step is not absolutely necessary, since the film could also be manually pressed into the mould by smoothing along the direction of the channels. Once the film is satisfactorily pressed or sucked into the mould to give a favourably smooth surface, the component layers can be laid up to form the wind turbine blade, as already described, on the inside surface 31 of the film 3.

Figure 4:
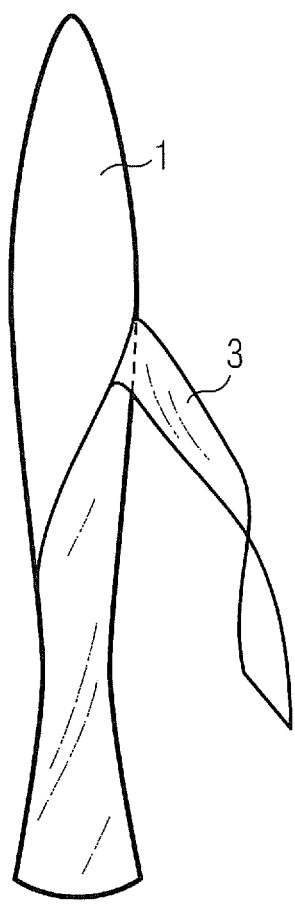
FIG. 4 shows a film being detached from a wind turbine blade moulded using the method according to the invention.

FIG. 4 shows a film 3 being detached from a cured wind turbine blade 1 moulded using the method according to the invention. As the diagram shows, the film 3 can easily be detached from the cured blade 1 by simply peeling off the film 3. Assuming that the film 3 lined the mould to give a smooth lining without any wrinkles, the surface of the cured blade 1 is smooth, clean, free of any residue, and ready for any finishing steps such as priming or painting.

Although the present invention has been disclosed in the foam of preferred embodiments and variations thereon, it will be understood that numerous additional modifications and variations could be made thereto without departing from the scope of the invention. For example, instead of removing the film, a specific film material may be used so that the film could be left on the cured wind turbine blade. For example, if the outside surface of the film has appropriate properties, it could be included in any subsequent finishing steps such as priming or painting, and may even serve a protective function.

For the sake of clarity, it is to be understood that the use of "a" or "an" throughout this application does not exclude a plurality, and "comprising" does not exclude other steps or elements. A "unit" or "module" can comprise a number of units or modules, unless otherwise stated.

The invention claimed is:

1. A method for moulding a wind turbine blade in a mould, comprising:
    applying a film to an inside surface of the mould;
    extracting air from between the film and the inside surface of the mould, wherein said extraction is facilitated by providing at least one channel on the inside surface of the mould;
    assembling a component layer of the wind turbine blade on the film;
    performing curing to harden the component layer; and
    removing the wind turbine blade from the mould after curing of the component layer,
    wherein at least a part of the step of extracting of air from between the film and the inside surface of the mould is carried out prior to commencing the assembling of the component layer of the wind turbine in the mould.

2. The method according to claim 1, wherein the film comprises one or more polymers from the group consisting of polyethylene and polypropylene.

3. The method according to claim 1, wherein the film has a thickness in the range 20 μm to 200 μm.

4. The method according to claim 1, further comprising detaching the film from the wind turbine blade after the wind turbine blade has been removed from the mould.

5. The method according to claim 1, wherein the inside surface of the mould comprises a non-stick lining.

6. The method according to claim 1, wherein the mould comprises a closed mould.

7. The method according to claim 1, the assembling of the component layer on the film comprises laying up a plurality of fibreglass layers.

8. The method according to claim 1, wherein the film is provided as a sheet, wherein applying the film to the inside surface of the mould comprises laying out the sheet to line the mould.

9. The method according to claim 1, wherein the mould comprises a nozzle via which said extraction is carried out, wherein the at least one channel is arranged in a direction of the nozzle.

10. A method for moulding a wind turbine blade in a mould, comprising:
- applying a film to an inside surface of the mould;
- extracting air from between the film and the inside surface of the mould, wherein said extraction is facilitated by providing a relief structure on an outer surface of the film which faces the inside surface of the mould;
- assembling a component layer of the wind turbine blade on the film;
- performing curing to harden the component layer; and
- removing the wind turbine blade from the mould after curing of the component layer,
- wherein at least a part of the step of extracting of air from between the film and the inside surface of the mould is carried out prior to commencing the assembling of the component layer of the wind turbine in the mould.

* * * * *